United States Patent [19]
Ikeno et al.

[11] Patent Number: 4,886,865
[45] Date of Patent: Dec. 12, 1989

[54] ORGANOPOLYSILOXANE COMPOSITION

[75] Inventors: Masayuki Ikeno, Annaka; Hironao Fujiki; Hiroshi Inomata, both of Takasaki, all of Japan

[73] Assignee: Shin-Etsu Chemical Co., Ltd., Tokyo, Japan

[21] Appl. No.: 169,849

[22] Filed: Mar. 18, 1988

[30] Foreign Application Priority Data

Mar. 24, 1987 [JP] Japan .................................. 62-69594

[51] Int. Cl.$^4$ ............................................. C08G 77/06
[52] U.S. Cl. ........................................ 528/15; 528/31; 528/32; 525/478
[58] Field of Search ...................... 528/15, 478, 31, 32

[56] References Cited

U.S. PATENT DOCUMENTS

| | | | |
|---|---|---|---|
| 3,269,983 | 8/1966 | Holbrook | 528/15 |
| 3,423,236 | 1/1969 | Quaal | 528/32 |
| 3,553,164 | 1/1971 | Curry | 528/32 |
| 3,975,362 | 8/1976 | Kim et al. | 528/15 |
| 4,374,967 | 2/1983 | Brown et al. | 525/478 |
| 4,683,278 | 7/1987 | Suzuki | 528/32 |

Primary Examiner—John C. Bleutge
Assistant Examiner—R. Dean, Jr.
Attorney, Agent, or Firm—Wyatt, Gerber, Burke and Badie

[57] ABSTRACT

The organopolysiloxane composition is useful as a potting or encapsulating material having a gel-like consistency for protecting electronic components even at an extremely low temperature as is encountered in the space industry. The composition is basically of the type in which crosslinks are formed by the addition reaction between silicon-bonded vinyl groups in an organopolysiloxane and silicon-bonded hydrogen atoms in an organohydrogenpolysiloxane but the outstanding cold resistance of the gel-like material obtained from the composition is imparted by incorporating specific silethylene-containing units of the unit formula OSiMe—CH$_2$CH$_2$—SiMe$_2$O$_{0.5}$ into the organopolysiloxane in a specified molar content.

3 Claims, No Drawings

ORGANOPOLYSILOXANE COMPOSITION

BACKGROUND OF THE INVENTION

The present invention relates to an organopolysiloxane composition or, more particularly, to an organopolysiloxane composition crosslinkable into a gel-like form useful for protection of electronic components even at an extremely low temperature.

It is widely practiced in the electric and electronic industries to protect, in particular, various kinds of devices or components in electronic circuits such as power transistors, integrated circuits, capacitors and the like against mechanical damages and influences of heat and moisture from the ambience by potting or encapsulation with a gel-like material formed from a crosslinkable organopolysiloxane composition. A demand in recent years for such a crosslinkable organopolysiloxane composition is that the gel-like material formed therefrom has stable characteristics of protection for electronic components even at an extremely low temperature in order to meet the requirement in the space industry and other fields under rapid progress.

A means hitherto undertaken for improving the cold resistance of the organopolysiloxane composition is to introduce a substantial amount of phenyl groups into the molecular structure of the organopolysiloxane while a composition based on a high-phenyl organopolysiloxane has a problem of decreased excludability of bubbles contained in the liquid composition to cause a decrease in the workability therewith. Another means for the same purpose hitherto undertaken is to introduce trifunctional siloxane units $CH_3SiO_{1.5}$ into the molecular structure of the organopolysiloxane. A problem in this way is the difficulty in controlling the viscosity of the organopolysiloxane so that good reproducibility can hardly be expected in the performance of the organopolysiloxane composition relative to the behavior of gelation and reliable cold resistance after crosslinking.

SUMMARY OF THE INVENTION

The present invention accordingly has an object to provide an organopolysiloxane composition capable of being reproducibly crosslinked and giving a gel-like material suitable for reliable protection of electronic components with stability even at an extremely low temperature by solving the above mentioned problems in the similar compositions known in the prior art.

Thus, the organopolysiloxane composition of the present invention comprises, in admixture:

(A) an organopolysiloxane composed of:
  (i) from 80 to 97.5% by moles of diorganosiloxane units represented by the general unit formula $R_2SiO$, in which R is a substituted or unsubstituted monovalent hydrocarbon group free from aliphatic unsaturation,
  (ii) from 1.2 to 10% by moles of silethylene-containing units expressed by the unit formula $OSiMe—CH_2CH_2—SiMe_2O_{0.5}$, in which Me is a methyl group.
  (iii) from 1.2 to 10% by moles of trimethyl siloxy units expressed by the unit formula $Me_3SiO_{0.5}$, in which Me is a methyl group, and
  (iv) from 0.1 to 4.0% by moles of dimethyl vinyl siloxy units expressed by the unit formula $Me_2ViSiO_{0.5}$, in which Me is a methyl group and Vi is a vinyl group;

(B) an organohydrogenpolysiloxane having, in a molecule, at least one siloxane unit represented by the unit formula:

$$R_aH_bSiO_{(4-a-b)/2},$$

in which R has the same meaning as defined above, the subscript a is 0, 1 or 2 and the subscript b is 1 or 2 with the proviso that $a+b=1$, 2 or 3, in an amount sufficient to provide from 0.2 to 4 moles of hydrogen atoms directly bonded to the silicon atoms per mole of the vinyl groups bonded to the silicon atoms in the component (A);

(C) a noble metal compound in an amount sufficient to promote the addition reaction between the silicon-bonded vinyl groups in the component (A) and the silicon-bonded hydrogen atoms in the component (B).

DETAILED DESCRIPTION OF THE PREFERRED EMBODIMENTS

The most characteristic component in the above defined organopolysiloxane composition of the invention is the component (A) which is basically a diorganopolysiloxane mainly composed of the diorganosiloxane units $R_2SiO$ or, in particular, dimethyl siloxane units $Me_2SiO$. By virtue of the introduction of the specific units of the formula $OSiMe—CH_2CH_2—SiMe_2O_{0.5}$ into the molecular structure, the organopolysiloxane as the component (A) is not solidified even at $-55°$ C., which temperature is sometimes encountered in antarctic areas, or crystallized at $-95°$ C., at which cold resistance is required for the materials used in space, and remains amorphous down to the glass transition temperature $T_g$ of $-123°$ C. so that the composition can give an excellently cold-resistant crosslinked product having a gel-like consistency to rubbery elasticity by the addition reaction or so-called hydrosilation reaction between the silicon-bonded vinyl groups therein and the silicon-bonded hydrogen atoms in the component (B).

The component (A) in the inventive composition is a silethylene-containing organopolysiloxane of which the principal siloxane units are the diorganosiloxane units of the unit formula $R_2SiO$. In this unit formula, R is a substituted or unsubstituted monovalent hydrocarbon group free from aliphatic unsaturation exemplified by alkyl groups, e.g., methyl, ethyl, propyl and butyl groups, cycloalkyl groups, e.g., cyclohexyl group, and aryl groups, e.g., phenyl and tolyl groups, as well as those substituted groups obtained by replacing a part of all of the hydrogen atoms in the above named hydrocarbon groups with halogen atoms, cyano groups and the like, e.g., chloromethyl, 3,3,3-trifluoropropyl and 2-cyanoethyl groups. Although the group denoted by R can be freely selected from the above named groups, it is preferable that most or all of the groups denoted by R are methyl groups in order to impart the inventive composition with good heat resistance. The organopolysiloxane as the component (A) is composed of four types of the units (i), (ii), (iii) and (iv) defined above, from 80% to 97.5% by moles of these units should be (i) the diorganosiloxane units of the unit formula $R_2SiO$.

The organopolysiloxane as the component (A) characteristically contains (ii) the silethylene-containing units of the unit formula $OSiMe—CH_2CH_2—SiMe_2O_{0.5}$ as an essential constituent to impart cold resistance to the organopolysiloxane composition. In this regard, at least 1.2% by moles of the units forming the organopolysiloxane should be these silethylene-containing units since no good cold resistance can be obtained of the organopolysiloxane containing the units in a smaller molar percentage. Increase of the molar content of these silethylene-containing units over 10% by moles is, however, not economically advantageous with little further increase in the cold resistance of the composition.

The organopolysiloxane as the component (A) has two types of monofunctional terminal groups including, one, trimethyl siloxy groups of the unit formula $Me_3SiO_{0.5}$ and, the other, dimethyl vinyl siloxy groups of the unit formula $Me_2ViSiO_{0.5}$. The dimethyl vinyl siloxy units are essential to provide crosslinking points to react with the silicon-bonded hydrogen atoms in the component (B). In this regard, from 0.1% to 4.0% by moles of the units forming the organopolysiloxane should be the dimethyl vinyl siloxy units. When the molar content thereof is too small, the organopolysiloxane composition cannot give a crosslinked product having a gel-like consistency due to the deficiency in the crosslinking density. When the molar content thereof is too large, on the other hand, the heat resistance of the composition after crosslinking may be somewhat decreased due to the excessively high crosslinking density. The trimethyl siloxy groups are introduced in order to obtain an adequate viscosity of the organopolysiloxane. When the content of the trimethyl siloxy units is too low, the organopolysiloxane may have an unduly high viscosity to cause some difficulty in handling. When the content thereof is too large, on the other hand, the organopolysiloxane may contain an increased amount of low-molecular species so that the volatilization loss of the composition is increased in the course of the crosslinking reaction by heating. In this regard, the content of the trimethyl siloxy units in the organopolysiloxane should be in the range from 1.2% to 10% by moles.

The organopolysiloxane as the component (A) can be prepared by the so-called siloxane equilibration reaction of a starting organopolysiloxane expressed, for example, by the formula

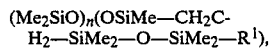

in which $R^1$ is a methyl or vinyl group and n is a positive integer of 3 to 6.

The component (B) in the inventive organopolysiloxane composition is a organohydrogenpolysiloxane having, in a molecule, at least one hydrogen atom directly bonded to the silicon atom. An additional reaction takes place between the silicon-bonded vinyl groups in the component (A) and the silicon-bonded hydrogen atoms in this component. In other words, the organohydrogenpolysiloxane should contain, in a molecule, at least one siloxane unit of the unit formula $R_aH_bSiO_{(4-a-b)/2}$, in which R is a substituted or unsubstituted monovalent hydrocarbon group free from aliphatic unsaturation, a is 0, 1 or 2 and b is 1 or 2 with the proviso that $a+b=1$, 2 or 3. The amount of the organohydrogenpolysiloxane in the inventive composition should be sufficient to provide from 0.2 to 4.0 moles of the silicon-bonded hydrogen atoms per mole of the silicon-bonded vinyl groups in the component (A). When the amount of the component (B) is too small, an excessively large amount of the silicon-bonded vinyl groups may remain unreacted to decrease the heat resistance of the composition after crosslinking. When the amount thereof is too large, on the other hand, the heat resistance of the composition is also decreased along with a disadvantageous phenomenon of eventual foaming when the composition is heated to effect crosslinking.

The component (C) is a catalyst to promote the addition reaction between the silicon-bonded vinyl groups in the component (B). Various compound of noble metals, e.g., platinum, palladium, rhodium and the like, are known to have catalytic activity for the reaction, of which platinum compounds are preferred. Examples of suitable catalytic compounds include chloroplatinic acid, alcohol-modified chloroplatinic acid prepared by dissolving the same in an alcohol, coordination compounds of chloroplatinic acid with an olefin or a vinyl siloxane, tetrakis(triphenyl phosphine) palladium and the like. The amount of the platinum compound in the inventive composition is not particularly limitative depending on the desired velocity of the crosslinking reaction. As a rough measure, the amount is usually in the range from 0.1 to 100 ppm as platinum by weight based on the amount of the organopolysiloxane as the component (A).

The organopolysiloxane composition of the present invention can be prepared by uniformly blending the above described components (A), (B) and (C). It is optional that the composition is admixed with a small amount of an organopolysiloxane having no dimethyl vinyl siloxy unit in the molecule such as a trimethylsiloxy-terminated dimethylpolysiloxane or an inorganic filler with an object to adequately control the consistency and mechanical strength of the composition after the crosslinking reaction depending on the intended application of the composition. Examples of suitable inorganic fillers include fumed silica, silica aerogel, precipitated silica, finely pulverized quartz, diatomaceous earth, iron oxide, zinc oxide, titanium dioxide, calcium carbonate, magnesium carbonate, zinc carbonate and the like. If desired, the composition may be admixed with a known reaction moderator such as ethynyl cyclohexanol.

The organopolysiloxane composition of the invention prepared in the above described manner is converted into a gel-like material by crosslinking when it is kept at room temperature for 24 hours or heated, for example, at 150° C. for 30 minutes. The gel-like material is highly transparent though dependent on the type and amount of the inorganic filler contained therein. The consistency of the gel-like material is highly cold-resistant and very stable independently of the temperature below room temperature without solidification at $-55°$ C. or crystallization at $-95°$ C. remaining amorphous down to the glass transition temperature of $-123°$ C. The inventive composition with these unique characteristics is very useful for the purpose of protecting various electronic components possibly used at an extremely low temperature.

In the following, the organopolysiloxane composition of the present invention is described in more detail by way of examples as preceded by the synthetic examples for the preparation of the specific silethylene-containing organopolysiloxane as the component (A). In the following description, the term of "parts" always refers to "parts by weight" and the values of viscosity are all those obtained by the measurement at 25° C.

SYNTHETIC PREPARATION 1

A mixture composed of 941 g of octamethyl cyclotetrasiloxane, 55 g of a silethylene-containing cyclic organopolysiloxane of the formula (Me$_2$SiO)$_3$-(OSiMe—CH$_2$CH$_2$—SiMe$_2$—O—SiMe$_3$), 3.1 g of decamethyl tetrasiloxane and 1.86 g of 1,1,3,3-tetramethyl-1,3-divinyl disiloxane was admixed with potassium silanolate as a catalyst in such an amount as to give a Si:K molar ratio of 10$^4$ and heated at 150° C. for 8 hours to effect the equilibration reaction. After cooling to 50° C., the reaction mixture was admixed with 0.2 g of trimethyl chlorosilane and 2 g of hexamethyl disilazane and agitated for 2 hours to neutralize the alkaline catalyst followed by stripping of low-molecular materials by heating at 180° C. for 8 hours under a pressure of 20 Torr with continued bubbling of nitrogen gas and then filtration. In this manner, 870 g of an organopolysiloxane were obtained which had a viscosity of 1200 centipoise and composed of 97.9% by moles of dimethyl siloxane units Me$_2$SiO, 0.9% by moles of the units of the formula OSiMe—CH$_2$CH$_2$—SiMe$_2$O$_{0.5}$, 1% by moles of trimethyl siloxy units Me$_3$SiO$_{0.5}$ and 0.2% by moles of dimethyl vinyl siloxy units Me$_2$ViSiO$_{0.5}$. This product is referred to as the Siloxane A-1 hereinbelow.

SYNTHETIC PREPARATION 2

The experimental procedure was substantially the same as in Synthetic Preparation 1 described above except that the reaction mixture subjected to the equilibration reaction was composed of 947 g of octamethyl cyclotetrasiloxane, 75 g of the same silethylene-containing organopolysiloxane, 3.1 g of decamethyl tetrasiloxane and 1.86 g of 1,1,3,3-tetramethyl-1,3-divinyl disiloxane to give 914 g of an organopolysiloxane which had a viscosity of 1000 centipoise and composed of 97.3% by moles of dimethyl siloxane units Me$_2$SiO, 1.2% by moles of the units of the formula OSiMe—CH$_2$CH$_2$—SiMe$_2$O$_{0.5}$, 1.35% by moles of trimethyl siloxy units Me$_3$SiO$_{0.5}$ and 0.15% by moles of dimethyl vinyl siloxy units Me$_2$ViSiO$_{0.5}$. This product is referred to as the Siloxane A-2 hereinbelow.

SYNTHETIC PREPARATION 3

The experimental procedure was substantially the same as in Synthetic Preparation 1 described above except that the reaction mixture subjected to the equilibration reaction was composed of 1400 g of octamethyl cyclotetrasiloxane, 301 g of the same silethylene-containing cyclic organopolysiloxane, 0.9 g of decamethyl tetrasiloxane and 3.2 g of 1,1,3,3-tetramethyl-1,3-divinyl disiloxane to give 1480 g of an organopolysiloxane which had a viscosity of 1050 centipoise and composed of 93.9% by moles of dimethyl siloxane units Me$_2$SiO, 2.9% by moles of the units of the formula OSiMe—CH$_2$CH$_2$—SiMe$_2$O$_{0.5}$, 3% by moles of trimethyl siloxy units Me$_3$SiO$_{0.5}$ and 0.2% by moles of dimethyl vinyl siloxy units Me$_2$ViSiO$_{0.5}$. This product is referred to as the Siloxane A-3 hereinbelow.

SYNTHETIC PREPARATION 4

The experimental procedure was substantially the same as in Synthetic Preparation 1 described above except that the reaction mixture subjected to the equilibration reaction was composed of 695 g of octamethyl cyclotetrasiloxane, 374 g of the same silethylene-containing cyclic organopolysiloxane and 1.86 g of 1,1,3,3-tetramethyl-1,3-divinyl disiloxane to give 930 g of an organopolysiloxane which had a viscosity of 520 centipoise and composed of 87.8% by moles of dimethyl siloxane units Me$_2$SiO, 6% by moles of the units of the formula OSiMe—CH$_2$CH$_2$—SiMe$_2$O$_{0.5}$, 6% by moles of trimethyl siloxy units Me$_3$SiO$_{0.5}$ and 0.2% by moles of dimethyl vinyl siloxy units Me$_2$ViSiO$_{0.5}$. This product is referred to as the Siloxane A-4 hereinbelow.

EXAMPLE

A uniform organopolysiloxane composition was prepared by mixing 100 parts of the Siloxane A-1 prepared in Synthetic Preparation 1, 0.29 part of a methylhydrogenpolysiloxane composed of 45% by moles of methylhydrogensiloxane units of the formula MeSiO, 50% by moles of dimethylsiloxane units of the formula Me$_2$SiO and 5% by moles of trimethylsiloxy units of the formula Me$_3$SiO$_{0.5}$ and 0.04 part of ethynyl cyclohexanol with admixture of a complex of chloroplatinic acid and a vinyl-siloxane in an amount of 5 ppm by weight calculated as platinum based on the overall amount of the mixture. This composition is referred to as the Composition I hereinbelow.

A second organopolysiloxane composition, which is referred to as the Composition II hereinbelow, was prepared in substantially the same formulation as in the Composition I except that the Siloxane A-1 was replaced with the same amount of the Siloxane A-2 prepared in Synthetic Preparation 2 and the amount of the methylhydrogenpolysiloxane was increased to 0.30 part.

A third organopolysiloxane composition, which is referred to as the Composition III hereinbelow, was prepared in substantially the same formulation as in the Composition I except that the Siloxane A-1 was replaced with the same amount of the Siloxane A-3 prepared in Synthetic Preparation 3 and the amount of the methylhydrogenpolysiloxane was increased to 0.34 part.

A fourth organopolysiloxane composition, which is referred to as the Composition IV hereinbelow, was prepared in substantially the same formulation as in the Composition I except that the Siloxane A-1 was replaced with the same amount of the Siloxane A-4 prepared in Synthetic Preparation 4 and the amount of the methylhydrogenpolysiloxane was increased to 0.33 part.

Each of these Compositions was heated at 150° C. for 30 minutes to effect the addition reaction between the silicon-bonded vinyl groups and the silicon-bonded hydrogen atoms so that the composition was converted into a gel-like material, of which penetration test was undertaken with a penetrometer of ¼-scale to give values of 108, 105, 90 and 100 for the gel-like materials obtained from the Compositions I, II, III and IV, respectively. Further, the glass transition temperature of the gel-like materials were determined on a differential scanning calorimeter by using 10 mg of the gel-like material first frozen at −150° C. followed by gradual temperature elevation at a rate of 5° C. per minute to find that each of the gel-like materials had a glass transition temperature of −123° C. The gel-like materials obtained from the Compositions II, III and IV were absolutely free from any crystalline phase and remained amorphous with full clarity at a temperature higher than −123° C. while certain crystalline phase was noted in the gel-like material obtained from the Composition I even at a temperature higher than −123° C. indicating the criticality of the molar content 1.2% of the silethylene-containing units in the organopolysiloxane in order that the gel-like material can retain the amorphousness down to the glass transition temperature which is an essential requirement for the material to give full pro-

What is claimed is:

1. An organopolysiloxane composition which comprises, in admixture:
   (A) an organopolysiloxane composed of:
      (i) from 80 to 97.5% by moles of diorganosiloxane units represented by the general unit formula $R_2SiO$, in which R is a substituted or unsubstituted monovalent hydrocarbon group free from aliphatic unsaturation,
      (ii) from 1.2 to 10% by moles of silethylene-containing units expressed by the unit formula $OSiMe-CH_2CH_2-SiMe_2O_{0.5}$, in which Me is a methyl group,
      (iii) from 1.2 to 10% by moles of trimethyl siloxy units expressed by the unit formula $Me_3SiO_{0.5}$, in which Me is a methyl group, and
      (iv) from 0.1 to 4.0% by moles of dimethyl vinyl siloxy units expressed by the unit formula $Me_2ViSiO_{0.5}$, in which Me is a methyl group and Vi is a vinyl group;
   (B) an organohydrogenpolysiloxane having, in a molecule, at least one siloxane unit represented by the unit formula $$R_aH_bSiO_{(4-a-b)/2},$$

in which R has the same meaning as defined above, the subscript a is 0, 1 or 2 and the subscript b is 1 or 2 with the proviso that $a+b=1$, 2 or 3, in an amount sufficient to provide from 0.2 to 4 moles of hydrogen atoms directly bonded to the silicon atoms per mole of the vinyl groups bonded to the silicon atoms in the component (A);
   (C) a noble metal compound in an amount sufficient to promote the addition reaction between the silicon-bonded vinyl groups in the component (A) and the silicon-bonded hydrogen atoms in the component (B).

2. The organopolysiloxane composition as claimed in claim 1 wherein the group denoted by R is a methyl group.

3. The organopolysiloxane composition as claimed in claim 1 wherein the noble metal compound is a platinum compound.